M. Reed,
Cultivator.
No. 108,518. Patented Oct. 18, 1870.

Witnesses.
Chas. Kenyon.
Villette Anderson.

Inventor.
Moses Reed
Chipman Hosmer & Co.
Attorneys

UNITED STATES PATENT OFFICE.

MOSES REED, OF LITTLE ROCK, ARKANSAS.

IMPROVEMENT IN COTTON AND CORN CULTIVATORS.

Specification forming part of Letters Patent No. 108,518, dated October 18, 1870.

*To all whom it may concern:*

Be it known that I, MOSES REED, of the city of Little Rock, in the county of Pulaski and State of Arkansas, have invented a new and useful Machine for the Cultivation of Cotton and Corn, which machine is an adjustable and reversible cotton and corn cultivator; and I do hereby declare that the following is a full, clear, and exact description of the construction and operation of the same, reference being had to the annexed drawings, making a part of this specification, in which—

Figure 1:
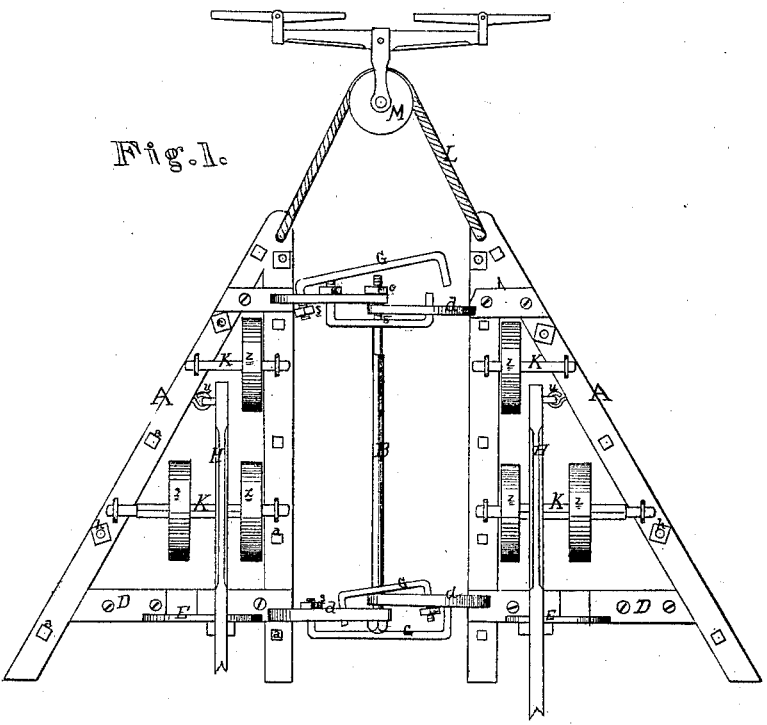
Figure 2:
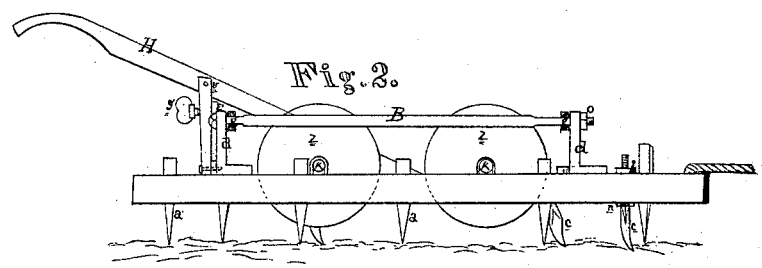

Figure 1 is a plan view of my invention. Fig. 2 is a side view of one harrow or section thereof.

My invention has relation to means for cultivating cotton; and it consists in a novel arrangement of devices intended to serve as an efficient apparatus for the purpose named.

A A of the drawings represent two triangular frames, shaped like ordinary harrows, except that the outer beams are placed on an acute angle, while the inner beams are arranged on lines parallel to the cotton-rows. The outer beams are also extended rearward beyond the inner beams, as shown. In these beams, respectively, I arrange alternately harrow-teeth $a$ and small shovels $c$, as represented on Fig. 2. The plows are made adjustable in the beams by means of a nut and screw, $h$, and a jam-nut, $n$. I attach a plate to each of the harrows and form therewith circular arms, (marked $d$,) which said arms are perforated in the manner shown, for purposes of adjustment. Upon the front end of each harrow only one plate is attached; but upon the cross-beam, at the rear thereof, I construct and affix an additional plate, as shown at D, and connect the same with the rear plate by means of a segment, E. The two harrows A are connected together by the rod B, which passes through the circular arm, as shown at $g$, and are secured in place by nuts $o$, working on screw-threads upon the ends of said rod.

G G represent bent rods or staples, one end of which is passed through a perforation of an arm, $d$, and held in position by a nut and thread, as shown at $s$, while the other ends are allowed to swing and be passed into a perforation of the arm $d$ upon the opposite harrow. I usually arrange two of these staples at each end of the cultivator, as shown on Fig. 1 of the drawings. By means of these adjustable staples and openings in the circular arms the operator is enabled to arrange the pitch of the harrows to any desired angle, so as to adapt them to the inclination of the raised hills or rows in which the cotton-plants are growing.

H H represent the handles of my cultivator, made adjustable by having their front ends attached to the beams by hooks and eyes $u$, while their standards respectively are pivoted to the rear cross-beams, as shown at $v$. Set-screws $y\ y$, passing through the standards of these handles and working against the segments E, aid the operator in adjusting said handles.

K K represent axles secured upon the harrow-beams. On these axles I arrange wheels $z$. When the harrow-teeth and cultivator-plows have entered the ground to a sufficient depth, the harrows rest and move upon these wheels.

This apparatus is applicable to the cultivation of corn as well as cotton plants.

L represents the drag-rope, and M a pulley, by which the apparatus is moved forward.

I claim as my invention—

1. The combination of the arms $d$ and staples G, when arranged in a cotton-cultivator, substantially as and for the purpose specified.

2. The combination of the harrow A, segment E, set-screw $y$, and handle H, when constructed substantially as described, and for the purpose mentioned.

MOSES REED.

Witnesses:
M. W. BENJAMIN,
EDW. MASI.